T. S. HANCHETT.
Breeching-Attachment.

No. 161,408.                                Patented March 30, 1875.

Witnesses
Chas H Smith
Harold Serrell

Inventor
Thacher S. Hanchett.
per Lemuel W. Serrell
atty

UNITED STATES PATENT OFFICE.

THACHER S. HANCHETT, OF WOLCOTTVILLE, CONNECTICUT.

IMPROVEMENT IN BREECHING ATTACHMENTS.

Specification forming part of Letters Patent No. 161,408, dated March 30, 1875; application filed September 17, 1874.

*To all whom it may concern:*

Be it known that I, THACHER S. HANCHETT, of Wolcottville, in the county of Litchfield and State of Connecticut, have invented an Improved Holdback Attachment for Carriages, &c., of which the following is a specification:

It is usual to have the holdback-straps of harness attached at the ends of the breeching, and such straps are passed through staples upon the shafts when the horse is harnessed. It is necessary in this case to leave the holdback-straps loose or they will draw the breeching-straps upon the limbs of the horse, and prevent their free action. The ordinary breeching is also liable to chafe the horse, and, by the lateral pressure upon the hips, especially with a young horse, arrest the development of muscles, or cause it to interfere behind when holding back in going down hill. Holdback straps and bows have also been attached to the shafts, but they are not adjusted conveniently to the animal, so as to bear at the proper place.

My invention consists in a multiple staple made with several short vertical bars between horizontal bars in a triangular frame, and to one of these short bars in each multiple staple the holdback-strap is buckled, and by this improvement the holdback-strap can be placed in any position, so as to suit the length of the horse, or the required height of the holdback above the shafts.

Figure 1:
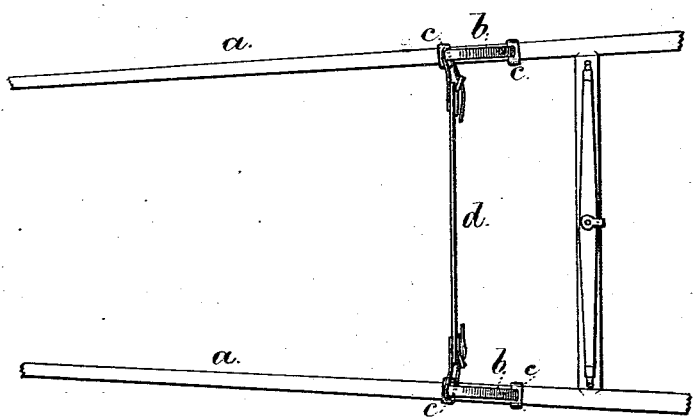
Figure 2:
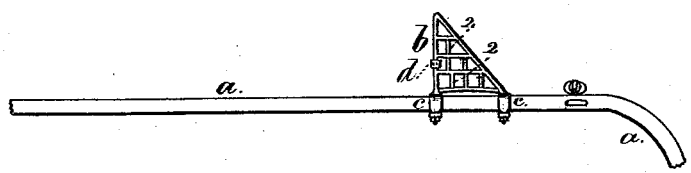

In the drawing, Figure 1 is a plan of the holdback, and Fig. 2 is an elevation of the multiple staple upon the shaft.

$a\ a$ are the shafts, as usual. $b\ b$ are the multiple holdback-staples attached to the shafts by clips $c$. The holdback-strap $d$ passes across the shafts behind the horse, and is attached at its ends to the staples $b$, and these staples, by their multiple form, allow the said strap to be adjusted vertically to suit the height of the horse, and also allow the holdback to be placed at a proper distance from the vehicle, according to the size of the horse. For this purpose the strap $d$ is buckled around either one of the bars 2 of the staple.

By the use of this holdback the breeching and its supporting-straps are dispensed with, and the horse relieved of their weight, and the horse can travel nearer to this holdback, thus requiring less necessary play and giving the driver more perfect control over the horse, and rendering it impossible for a kicking horse to get his heels high enough to damage the vehicle. And freedom of movement is not impeded, and the ordinary breeching hanging upon the horse is dispensed with. In descending a hill, or when the horse is backing, this holdback acts as usual to prevent the vehicle running upon its legs.

I claim as my invention—

The multiple-staple for the holdback-strap, made of the short vertical bars 2 between the horizontal bars in the frames attached to the shafts, for the purposes and as set forth.

Signed by me this 10th day of September, 1874.

THACHER S. HANCHETT.

Witnesses:
GIDEON H. WELCH,
JULIA BROOKER.